United States Patent
Wolfram et al.

(10) Patent No.: US 10,762,285 B2
(45) Date of Patent: Sep. 1, 2020

(54) METHODS AND SYSTEMS FOR GENERATING ELECTRONIC FORMS

(71) Applicant: Wolfram Research, Inc., Champaign, IL (US)

(72) Inventors: Stephen Wolfram, Concord, MA (US); Michael Poulshock, Philadelphia, PA (US)

(73) Assignee: Wolfram Research, Inc., Champaign, IL (US)

( * ) Notice: Subject to any disclaimer, the term of this patent is extended or adjusted under 35 U.S.C. 154(b) by 0 days.

(21) Appl. No.: 15/440,996

(22) Filed: Feb. 23, 2017

(65) Prior Publication Data
US 2017/0242835 A1     Aug. 24, 2017

Related U.S. Application Data

(60) Provisional application No. 62/298,981, filed on Feb. 23, 2016.

(51) Int. Cl.
*G06F 17/20*      (2006.01)
*G06F 40/174*     (2020.01)
*G06F 3/0484*     (2013.01)
*G06F 8/38*       (2018.01)
(Continued)

(52) U.S. Cl.
CPC .......... *G06F 40/174* (2020.01); *G06F 3/0484* (2013.01); *G06F 8/38* (2013.01); *G06F 9/44* (2013.01); *G06F 40/226* (2020.01)

(58) Field of Classification Search
CPC ........ G06F 3/0484; G06F 17/243; G06F 8/38; G06F 9/44; G06F 17/2725
See application file for complete search history.

(56) References Cited

U.S. PATENT DOCUMENTS 6,314,415 B1    11/2001  Mukherjee
6,342,907 B1 *   1/2002  Petty .................. G06F 8/10
                                              715/708
6,889,260 B1     5/2005  Hughes
(Continued)

OTHER PUBLICATIONS analysistabs.com, "Calculator using Excel VBA UserForm", Dec. 24, 2015, available at https://analysistabs.com/vba-code/excel-projects/calculator-userform/ (last accessed Jan. 2, 2018).*
Walkenbach, John, Excel 2013 Power Programming with VBA, John Wiley & Sons 2013.*
Familiar, Bob, Microservices, IoT, and Azure: Leveraging DevOps and Microservice Architecture to Deliver SaaS Solutions, Apress 2015.*
(Continued)

*Primary Examiner* — Shahid K Khan
(74) *Attorney, Agent, or Firm* — Faegre Drinker Biddle & Reath LLP

(57) ABSTRACT

In a method for generating an electronic form, programmer input in a programming language is received, the programmer input including specification data corresponding to an electronic form to be generated. The programmer input is evaluated to generate an electronic form object that includes one or more user-interface mechanisms for receiving the user input, including evaluating the specification data to generate code in the electronic form object, the generated code capable of being processed by an application to render the electronic form on or via a user interface device such that the electronic form serially prompts the user over time for multiple user inputs. The electronic form object is stored in a memory of or communicatively coupled to the one or more computers.

20 Claims, 10 Drawing Sheets

(51) Int. Cl.
*G06F 9/44* (2018.01)
*G06F 40/226* (2020.01)

(56) References Cited

U.S. PATENT DOCUMENTS

| | | | |
|---|---|---|---|
| 7,010,796 | B1 | 3/2006 | Strom et al. |
| 7,010,797 | B2 | 3/2006 | Smith et al. |
| 8,261,295 | B1 | 9/2012 | Risbood et al. |
| 8,589,869 | B2 | 11/2013 | Wolfram |
| 8,645,490 | B2 | 2/2014 | Christensen |
| 9,069,814 | B2 | 6/2015 | Wolfram et al. |
| 9,619,217 | B2 | 4/2017 | Wolfram et al. |
| 2002/0083072 | A1 | 6/2002 | Steuart |
| 2004/0233236 | A1 | 11/2004 | Yang |
| 2006/0116991 | A1 | 6/2006 | Calderwood |
| 2008/0222192 | A1 | 9/2008 | Hughes |
| 2009/0265610 | A1* | 10/2009 | Leonard ............... G06F 9/451 715/234 |
| 2012/0306898 | A1 | 12/2012 | Scheidhauer et al. |
| 2013/0125094 | A1 | 5/2013 | Wolfram et al. |
| 2014/0164315 | A1 | 6/2014 | Golshan |
| 2014/0280323 | A1 | 9/2014 | Seales |
| 2015/0042858 | A1 | 2/2015 | Kokubun et al. |
| 2015/0142858 | A1 | 5/2015 | Bryan et al. |
| 2015/0154012 | A1 | 6/2015 | Wolfram |
| 2015/0169679 | A1 | 6/2015 | Wolfram et al. |
| 2015/0186193 | A1 | 7/2015 | Jain et al. |
| 2015/0295781 | A1 | 10/2015 | Maes |
| 2016/0026438 | A1 | 1/2016 | Wolfram |
| 2017/0212737 | A1 | 7/2017 | Wolfram et al. |
| 2017/0220542 | A1 | 8/2017 | Wolfram et al. |
| 2017/0242864 | A1 | 8/2017 | Wolfram et al. |
| 2017/0244789 | A1 | 8/2017 | Wolfram et al. |
| 2018/0004721 | A1 | 1/2018 | Wolfram et al. |

OTHER PUBLICATIONS

Microsoft Developer Network, MaskedTextBox.ValidatingType Property, Jun. 21, 2014, available at https://msdn.microsoft.com/en-us/library/system.windows.forms.maskedtextbox.validatingtype(v=vs.110).aspx (last accessed Jun. 28, 2018).*
Familiar, Bob, Microservices, IoT, and Azure: Leveraging DevOps and Microservice Architecture to Deliver SaaS Solutions, Apress 2015 (Year: 2015).*
Familiar, Bob, Microservices, IoT, and Azure: Leveraging DevOps and Microservice Architecture to Deliver SaaS Solutions, Apress (Year: 2015).*
U.S. Appl. No. 15/483,121, Wolfram et al., "Methods and Systems for Generating Application Programming Interfaces," filed Apr. 10, 2017.
U.S. Appl. No. 15/485,923, Wolfram et al., "Methods and Systems for Generating Electronic Forms," filed Apr. 12, 2017.
Barnett, "Wolfram Alpha creator plans to delete the PDF," *The Telegraph*, Jun. 7, 2011, retrieved from http://www.telegraph.co.uk/technology/news/8561619/Wolfram-Alpha-creator-plans-to-delete-the-PDF.html on Jan. 20, 2016.
"Providing a URI for a remote file," dated Sep. 22, 2009, retrieved from http://web.archive.org/web/20120922194818/http://www.java2s.com/Tutorial/Java/0180File/ProvidingaURIforaremotefile.html on Feb. 22, 2016 (2 pages).
"Parse," Wikipedia entry (2 pp.); retrieved from https://en.wikipedia.org/ wiki/Parse_(company) on May 5, 2017.
Williams, "Appcelerator Acquires Singly, a Developer Platform for Integrating Third-Party Services," techcrunch.com, posted Aug. 22, 2013 (2 pages), retrieved from https://techcrunch.com/2013/08/22/appcelerator-acquires-singly-a-developer-platform-for-integrating-third-party-services/ on May 5, 2017.

* cited by examiner

FIG. 6A
```
                                            ← 600
              ← 604                608
AskFunction[                        ↓
        Ask[{"Question1", "estimate the value of π "} -> "Number"];
        Which[
                3.14 < Ask["Question1"] < 3.15, "correct",      ← 612
                3 < Ask["Question1"] < 3.5, "pretty close",
                True, "wrong"
        ]
] []
```
FIG. 6B
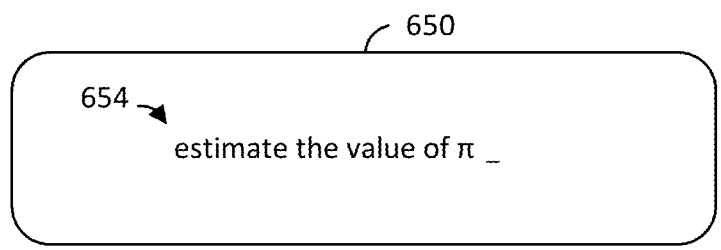
FIG. 6C
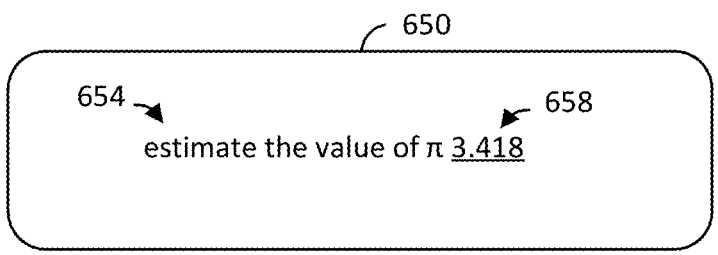
FIG. 6D
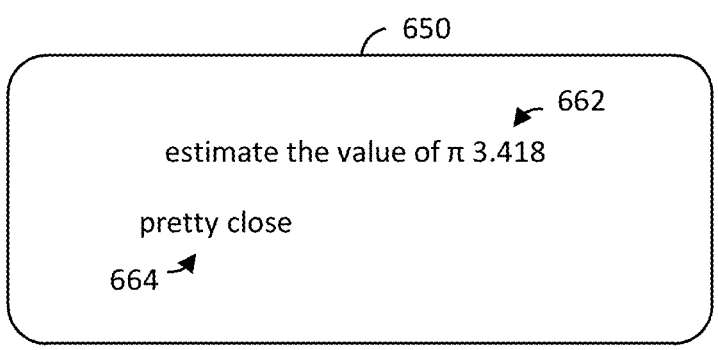

AskFunction[ ← 704
    user = {Ask["Name"], Ask["email"]};
    AskDisplay[ ← 708
        Row[{Thanks for signing up, here is your signup information:\n",
    "name: ", #name, "　email: ", #email}]&
    ]
] []

AskFunction[ ← 804
    Ask["Daily Report for Jen:"] -> "TextArea"];

If[MatchQ[Today, DateObject[{_, 2, 2}]], ← 808
    Ask[{"JenBirthdayAlert", "Jen's birthday is today! Add a note to
        my report:"} -> "String"]
    ];

Ask["Daily Report for Jen:"] <> "\n" <> ← 812
        Replace[AskedValue[JenBirthdayAlert], _?MissingQ[] -> ""]
] []

FIG. 8B

┌─────────────────────────── 850
│ Daily Report for Jen: _ │
└───────────────────────────┘

FIG. 8C

┌─────────────────────────── 850
│ Daily Report for Jen: - matched samples
│                   - performed tests (30% done)
│ Jen's birthday is today! Add a note to my report: _
└───────────────────────────┘

FIG. 8D

┌─────────────────────────── 850
│ Daily Report for Jen: - matched samples
│                   - performed tests (30% done)
│ Jen's birthday is today! Add a note to my report:
│ P.S.: Happy Birthday!!
└───────────────────────────┘

FIG. 8E

┌─────────────────────────── 850
│ - matched samples
│ - performed tests (30% done)
│ P.S.: Happy Birthday!!
└───────────────────────────┘

FIG. 9A
← 900
```
AskFunction[
    Ask[{"password", "choose a secret passphrase:"}-> "String"];
    AskConfirm["password", "Your secret passphrase will be
            remembered as \"'value'\".  Do you want to change it?"];
    "Thank you, passphrase confirmed."
] []
```
FIG. 9B
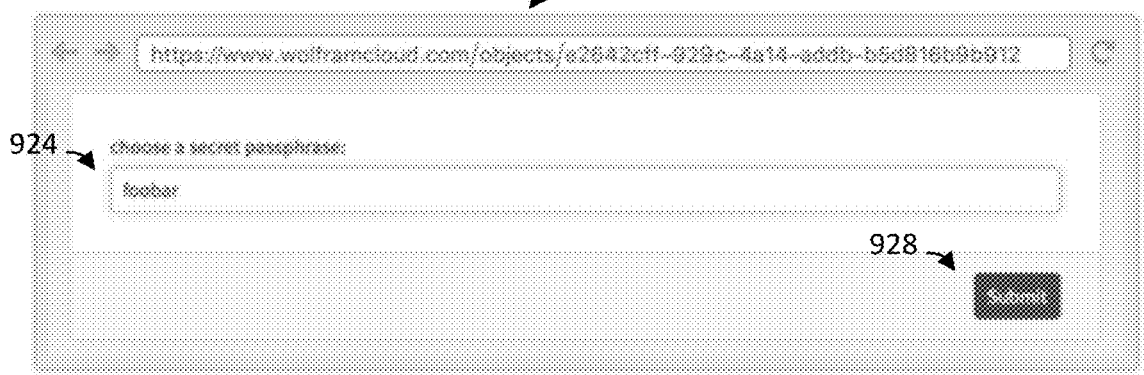
FIG. 9C
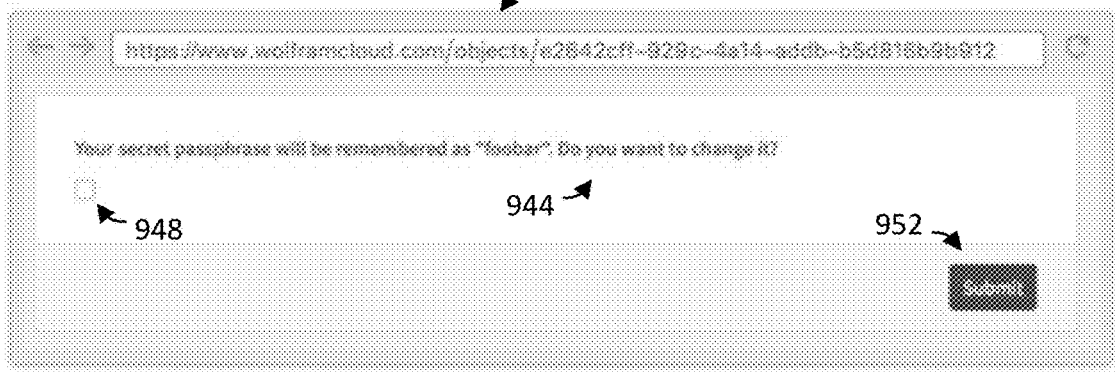
FIG. 9D
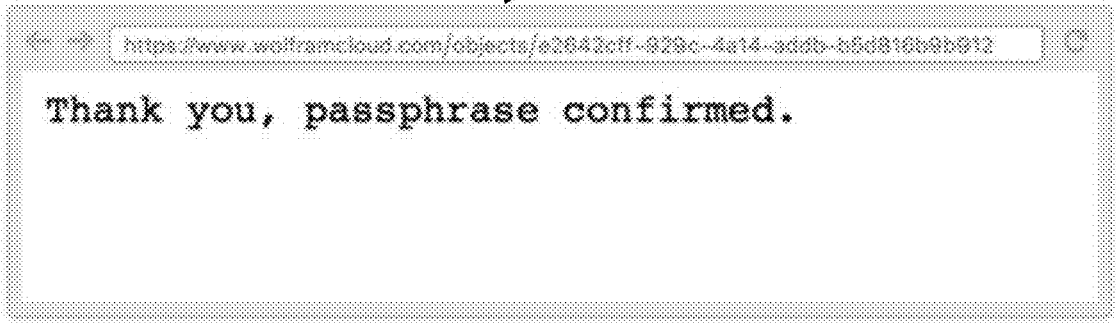

```
AskFunction[
      If[Ask["number of dependents" -> "Integer"]>19,

AskConfirm["number of dependents", "You are claiming 'value' dependents.
            That's an unusually large number of dependents.  Do you want
            to change this answer?"]
      ];
] []
```

```
AskFunction[
      Ask["A" -> "Number"];
      AskAppend["A"];
      AskAppend["A"]
] []
```

```
CloudDeploy[AskFunction[
      If[Ask[{"Status", "Are you a full time employee?"} -> "Boolean"] &&
        Ask[{"WorkYears", "How many months have you worked for us?"} ->
            "Number"] > 6,
            "You are eligible for vacation",
            "I'm sorry, you are not yet eligible for vacation"]
      ]
] []
```

```
CloudDeploy[AskFunction[                      ← 1304
        If[Ask[{"gender", "What is your gender?"} -> {"male", "female"}],
1308 →  Ask["pregnant"] = False,
1312 →  Ask[{"pregnant", "Are you pregnant?"} -> {"yes" -> True, "No" -> False}]];
        If[Ask["pregnant"], "Congratulations!", "ok"]]
        ]
```

```
CloudDeploy[AskFunction[
        If[Ask[{"x", "Enter a positive number"} -> "Number"] ≤ 0,    ← 1408
            AskDisplay["The value you entered is not positive.  Try again."]; Ask["x"]=. ,
            AskDisplay["Correct.  Good job!"]]]
        ]
```

METHODS AND SYSTEMS FOR GENERATING ELECTRONIC FORMS

CROSS-REFERENCE TO RELATED APPLICATION

The application claims the benefit of U.S. Provisional Application No. 62/298,981, filed on Feb. 23, 2016, entitled "Method and System for Generating Electronic Forms," which is hereby incorporated by reference herein in its entirety.

FIELD OF THE DISCLOSURE

The present disclosure generally relates to electronic forms, and more particularly, systems that enable development and deployment of electronic forms.

BACKGROUND

The present availability of high-capacity networks, computing power, and storage, as well as the widespread adoption of hardware virtualization, service-oriented architecture, and autonomic and utility computing have led to a growth in cloud computing.

In cloud computing, multiple remote servers (usually a large number) are networked to allow centralized data storage and online access to computer services or resources. Cloud resources are typically shared by multiple users and also dynamically reallocated based on demand.

Platform as a Service (PaaS) is a category of cloud computing services in which a computing platform and a solution stack are provided as a service. In PaaS, a provider provides a user with tools and/or libraries for creating an application or service to be hosted on the provider's platform, i.e., servers, storage, and other services that are required to host users' applications. Since PaaS systems typically support only a limited number of programming languages and frameworks, however, adopting a PaaS system may require utilizing an unfamiliar language and/or programming framework. PaaS systems often are also inflexible.

Many software programs, including programs created by and/or executed using cloud computing services, prompt a user to enter information via a computer. The user interfaces utilized to elicit user information are often referred to as forms. Writing software to generate such forms is typically time consuming.

Some electronic forms are designed as web pages so that a user can access and enter data into a form using a web browser. Web documents may contain content, markup language (e.g., Hypertext Markup Language (HTML), Extensible Hypertext Markup Language (XHTML), Extensible Markup Language (XML), etc.) elements, stylesheets (e.g., Cascading Style Sheets (CSS)), scripts (e.g., JAVASCRIPT®, etc.). Designing web documents using HTML, XHTML, etc., can be time consuming.

WYSIWYG (what you see is what you get) website builders are tools that provide a visual interface for website design; that is, the user of a WYSIWYG website builder is not required to learn code. Such website builders have a gentle learning curve and allow novices to build a website and get it running live on the Internet relatively quickly, although designing web documents using a WYSIWYG builder is still time consuming. Additionally, website builders are inflexible and have limitations with respect to creating web pages that differ from a fixed set of templates.

On the other hand, web editors are tools to facilitate manual construction of websites, and are highly flexible as compared to website builders. As with other web design tools, designing web documents using a web editor is time consuming. Additionally, web editors typically require users to have significant knowledge of web page coding and languages (e.g., HTML, XML, CSS, JAVASCRIPT®, etc.).

SUMMARY OF THE DISCLOSURE

In one embodiment, a method for generating an electronic form includes: receiving, at one or more computers, programmer input in a programming language, the programmer input including i) a built-in function of the programming language, and ii) specification data corresponding to an electronic form to be generated; and evaluating, at one or more computers, the programmer input to generate an electronic form object that includes one or more user-interface mechanisms for receiving the user input. Evaluating the programmer input to generate the electronic form object includes evaluating the specification data to generate code in the electronic form object, the generated code capable of being processed by an application to render the electronic form on or via a user interface device such that the electronic form serially prompts the user over time for multiple user inputs. The method further includes storing the electronic form object in a memory of or communicatively coupled to the one or more computers.

In another embodiment, a system for generating an electronic form comprises: one or more processors; and one or more memory devices coupled to the one or more processors. The one or more memories store machine readable instructions that, when executed by the one or more processors, cause the one or more processors to: receive programmer input in a programming language, the programmer input including specification data corresponding to an electronic form to be generated, and cause the programmer input to be evaluated to generate an electronic form object that includes one or more user-interface mechanisms for receiving the user input. Evaluating the programmer input to generate the electronic form object includes evaluating the specification data to generate code in the electronic form object, the generated code capable of being processed by an application to render the electronic form on or via a user interface device such that the electronic form serially prompts the user over time for multiple user inputs. The one or more memories further store machine readable instructions that, when executed by the one or more processors, cause the one or more processors to store the electronic form object in the one or more memories of the system and/or cause the electronic form object to be stored in one or more other memories communicatively coupled to the system.

In yet another embodiment, a tangible, non-transitory computer readable medium or media stores instruction thereon that, when executed by one or more computer processors, cause the one or more computer processors to: receive programmer input in a programming language, the programmer input including specification data corresponding to an electronic form to be generated; and cause the programmer input to be evaluated to generate an electronic form object that includes one or more user-interface mechanisms for receiving the user input. Evaluating the programmer input to generate the electronic form object includes evaluating the specification data to generate code in the electronic form object, the generated code capable of being processed by an application to render the electronic form on or via a user interface device such that the electronic form serially prompts the user over time for multiple user inputs. The tangible, non-transitory computer readable medium or media further stores instruction thereon that, when executed by one or more computer processors, cause the one or more computer processors to cause the electronic form object to be stored in one or more memories of a computer system.

BRIEF DESCRIPTION OF THE DRAWINGS

FIG. 6A is an example of programming input that may be utilized to generate an electronic form, according to an embodiment.

FIGS. 6B-D are illustrations of an electronic form generated in response to the programming input of FIG. 6A, according to an embodiment.

FIG. 7 is an example of programming input that may be utilized to generate an electronic form, according to an embodiment.

FIG. 8A is an example of programming input that may be utilized to generate an electronic form, according to an embodiment.

FIGS. 8B-D are illustrations of an electronic form generated in response to the programming input of FIG. 8A, according to an embodiment.

FIG. 8E is an illustration of output generated in response to user input being entered into the electronic form of FIGS. 8B-D, according to an embodiment.

FIG. 9A is an example of programming input that may be utilized to generate an electronic form, according to an embodiment.

FIGS. 9B-D are illustrations of an electronic form generated in response to the programming input of FIG. 9A, according to an embodiment.

FIG. 10 is an example of programming input that may be utilized to generate an electronic form, according to an embodiment.

FIG. 11 is an example of programming input that may be utilized to generate an electronic form, according to an embodiment.

FIG. 12 is an example of programming input that may be utilized to generate an electronic form, according to an embodiment.

FIG. 13 is an example of programming input that may be utilized to generate an electronic form, according to an embodiment.

FIG. 14 is an example of programming input that may be utilized to generate an electronic form, according to an embodiment.

DETAILED DESCRIPTION

Figure 1:
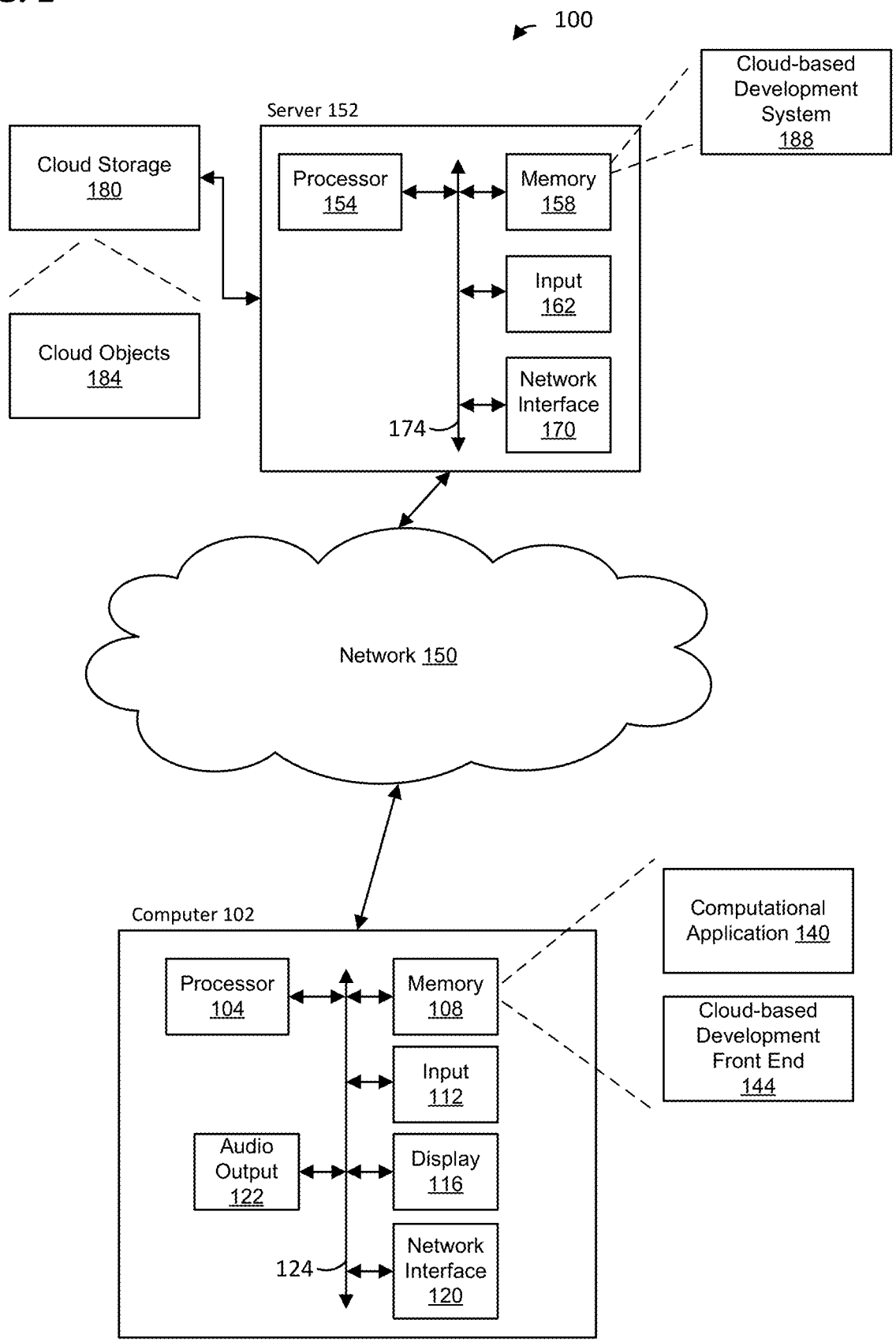
FIG. 1 is a diagram of an example cloud-based development system that may be utilized for generating electronic forms, according to some embodiments.

FIG. 1 is a diagram of an example system 100 for creating cloud objects, deploying objects to a cloud server system, and/or utilizing cloud services provided by the cloud server system, according to an embodiment. Examples of cloud objects include data, programs, functions, forms, application programming interfaces (APIs), etc., according to various embodiments. The cloud server system may make cloud objects privately and/or publicly available via a network such as an intranet, an extranet, the Internet, etc. U.S. patent application Ser. No. 14/549,541, entitled "Methods and Systems for Cloud Computing," filed on Nov. 20, 2014, which is hereby incorporated by reference, describes aspects and features of a cloud computing that optionally may be utilized in the system 100, according to various embodiments.

In various embodiments, the system 100 provides a cloud-based computing architecture that facilitates integration between and among desktop applications, mobile applications, web-based applications, hobbyist applications, etc. For example, in various embodiments, the system 100 supports one of, or any suitable combination of two or more of, programming infrastructure (e.g., various software development activities); remote processing infrastructure (e.g., including cloud storage and execution of user-defined functions and computer code); programming language translation/generation infrastructure (e.g., providing translation between programming languages and/or automated generation of computer code); and other infrastructure as described below. The infrastructure may be software or hardware based infrastructure, or a combination of both software and hardware infrastructure.

In an embodiment, the system 100 includes one or more computers, such as a computer 102. The computer 102 includes one or more processors 104 and one or more memory devices 108. The computer 102 also includes, or is coupled to, one or more input devices 112. Additionally, the computer 102 includes, or is coupled to, one or more display devices 116. In some embodiments, the computer 102 includes one or more network interface devices 120. In some embodiments, the computer 102 includes one or more audio output devices 122. The one or more processors 104, the one or more memory devices 108, the one or more input devices 112 (sometime referred to herein as "the input device 112" for brevity), the one or more display devices 116 (sometime referred to herein as "the display device 116" for brevity), the one or more network interface devices 120 (sometime referred to herein as "the network interface device 120" for brevity), the one or more audio output devices 122 (sometime referred to herein as "the audio output device 122" for brevity), etc., may be communicatively coupled via one or more busses 124 (sometime referred to herein as "the bus 124" for brevity). In other embodiments, the computer 102 may have other suitable structures and/or components.

The one or more processors 104 (sometime referred to herein as "the processor 104" for brevity) may comprise one or more general purpose processors (e.g., a central processing unit), one or more special purpose processors (e.g., a co-processor, a graphics processor, a digital signal processing (DSP) processor (e.g., for voice/speech recognition processing, voice/speech synthesis, etc.), etc.). At least one of the one or more processors 104 executes machine readable instructions stored in the memory 108. The one or more memory devices 108 (sometime referred to herein as "the memory 108" for brevity) include one or more of random access memory (RAM), read only memory (ROM), a FLASH memory, a magnetic disk drive, an optical disk drive, etc.

The one more input devices 112 include one or more suitable input devices such as a keyboard, a key pad, a mouse, a trackball, one or more buttons, a touch screen that overlays a display device, a microphone, etc. In some embodiments, the one or more input devices 112 may include an analog-to-digital converter (ADC) for converting an analog signal produced by a device such as a microphone to a digital signal.

The one more audio output devices 122 include one or more suitable audio generation devices. In various embodiments, an audio output device 122 includes one or more of a digital to analog converter (DAC), an amplifier, a speaker, a voice/speech synthesizer device, etc.

The one or more network interface devices 120 comprise one or more suitable network interface devices (NICs) such as a wired network NIC, a wireless network NIC, etc.

In some embodiments, the memory 108 may store a computational application 140 such as the MATH-EMATICA® computational application from Wolfram Research, Inc., a spreadsheet application, etc., where the computational application 140 is configured to create cloud objects, deploy objects to a cloud server system, and/or utilize cloud services provided by the cloud server system. For example, in an embodiment, the computational application 140 may include a cloud-based development front end 144 that enables creation of cloud objects, deployment of objects to the cloud server system, and/or utilization of cloud services provided by the cloud server system, according to various embodiments. In some embodiments, the computational application 140 is configured to provide an electronic user interface such as a workspace (e.g., a notebook, a spreadsheet, a document, etc.) in which a user can enter software code and/or functions to be evaluated, cause the functions to be evaluated, and/or view results of the evaluations.

In some embodiments, however, the computational application 140 is omitted and the cloud-based development front end 144 is a standalone application and/or module. In some embodiments, the cloud-based development front end 144 is incorporated into another suitable application different than the computational application 140.

In some embodiments, the memory 108 may store speech recognition software configured to process electrical signals produced by a microphone (e.g., after the electrical signals produced by the microphone have been sampled by an ADC).

In various embodiments, the computer 102 comprises a desktop computer, a workstation, a laptop computer, a tablet computer, a smart phone, a personal digital assistant, a gaming system, a cable-set-top box, a satellite-set-top box, a home automation hub device, a server, etc.

In some embodiments, the computer 102 (and/or other computers (not shown) are coupled to a network 150. The network 150 may comprise one or more of a local area network (LAN), a wide area network (WAN), a metropolitan area network (MAN), a mobile communications network, an intranet, an extranet, the Internet, etc.

In some embodiments, the system 100 may include one or more servers such as the server 152. FIG. 1 illustrates a single server 152 for brevity, but the system 100 includes multiple other similarly configured servers in some embodiments. In some embodiments, multiple servers (including the server 152) are networked together to provide online access to data storage and computer services or resources via the network 150. One server 152 will be discussed in detail with respect to FIG. 1, and other servers (if included) have the same or a similar suitable structure, in some embodiments.

The server 152 includes one or more processors 154 and one or more memory devices 158. The server 152 also may include, or be coupled to, one or more input devices 162. The server 152 includes one or more network interface devices 170. The one or more processors 154, the one or more memory devices 158, the one or more input devices 162 (sometime referred to herein as "the input device 162" for brevity), the one or more network interface devices 170 (sometime referred to herein as "the network interface device 170" for brevity), etc., may be communicatively coupled via one or more busses 174 (sometime referred to herein as "the bus 174" for brevity). In other embodiments, the server 152 may have other suitable structures and/or components.

The one or more processors 154 (sometime referred to herein as "the processor 154" for brevity) may comprise one or more general purpose processors (e.g., a central processing unit), one or more special purpose processors (e.g., a co-processor, a graphics processor, etc.). At least one of the one or more processors 154 executes machine readable instructions stored in the memory 158. The one or more memory devices 158 (sometime referred to herein as "the memory 158" for brevity) include one or more of random access memory (RAM), read only memory (ROM), a FLASH memory, a magnetic disk drive, an optical disk drive, etc.

The one more input devices 162 include one or more suitable input devices such as a keyboard, a key pad, a mouse, a trackball, one or more buttons, a touch screen that overlays a display device, etc. The one or more network interface devices 170 comprise one or more suitable NICs such as a wired network NIC, a wireless network NIC, etc. The server 152 is communicatively coupled to the computer 102 and other computers (not shown) via the communication network 150. The server 152 may be communicatively coupled to other cloud servers (not shown) via another network (not shown) and/or the network 150, in various embodiments.

Additionally, in some embodiments, the server 152 may be communicatively coupled to a cloud storage database system 180, which may comprise one or more suitable databases. The cloud storage database system 180 stores objects (cloud objects) 184 that are accessible, via the server 152 or another server, to computers (e.g., the computer 102) via the network 150.

In an embodiment, the memory 158 may store a cloud-based development system 188. In various embodiments, the cloud-based development system 188 is configured to interface with the cloud-based development front end 144 to transfer objects from the computer 102, to store objects in the cloud storage database 180, and/or to make objects 192 in the cloud storage database 180 accessible to computers via the network 150. In some embodiments, the computational application 140 is implemented as a kernel running on the server 152 and a front end running on the computer 102. In such embodiments, the cloud-based development system 188 includes the kernel. In some embodiments, the computational application 140 is included in the cloud-based development system 188 and the computer 102 runs a thin client such as a web browser. In some embodiments, aspects of the computational application 140 running on the server 152 (e.g., the kernel) are separate from the cloud-based development system 188.

In some embodiments, a user can utilize the computational application 140 and/or the cloud-based development front end 144, running on the computer 102, to create objects that are to be deployed to the cloud. The cloud-based development front end 144 may then interface with the cloud-based development system 188 to transfer the created objects to the server 152. The server 152 may then store the objects in the cloud storage database 180 and make the objects available to one or more computers via the network 150, or another network (not shown).

In some embodiments, the server 152 may be communicatively coupled to an answering system and/or natural language processing system such as described in U.S. Pat. No. 8,589,869 and/or U.S. patent application Ser. No. 13/678,168, filed Nov. 15, 2012, which are hereby incorporated by reference herein in their entireties. In some embodiments, the cloud-based development system 188 may interface with such systems and utilize natural language processing capabilities of such systems to process user input, for example.

In some embodiments, the server 152 utilizes virtualization techniques.

In various embodiments, a user can create a document, notebook, spreadsheet, program, etc., that is executed on the computer 102 (or another computer, not shown in FIG. 1) and that is configured to utilize cloud objects 184. For example, in some embodiments, a notebook, spreadsheet, program, etc., executed on the computer 102 stores data as a cloud object 184. As another example, in some embodiments, a document, notebook, spreadsheet, program, etc., executed on the computer 102 accesses data stored as a cloud object 184. As yet another example, in some embodiments, a notebook, spreadsheet, program, etc., executed on the computer 102 utilizes a cloud object 184 to perform a function and/or computation, a result of which is utilized by the notebook, spreadsheet, program, etc., which is executed on the computer 102.

Thus, in various embodiments, the cloud-based development system 188 may include various functional modules such one of or any suitable combination of two or more of a computational kernel (e.g., a MATHEMATICA® kernel) for performing pre-defined functions and for executing computer-readable instructions based on an associated language (e.g., the Wolfram Language™); a module to generate electronic forms; a module to generate code in different programming languages; a module to interpret free-form data and/or convert the free-form data into structured data; a module to facilitate cloud execution of various computational functions requested from external devices (e.g., other computers, servers, and/or embedded devices); etc.

Cloud Computing

In various embodiments, a programming language includes built-in functions that facilitate one or more of deployment of objects to the cloud, access to objects in the cloud, and/or manipulation of objects in the cloud. In various embodiments, one or more of the computational application 140, the cloud-based development front end 144, and the cloud-based development system module 188 are configured to evaluate such built-in functions to deploy objects to the cloud, access objects in the cloud, and/or manipulate objects in the cloud.

For example, in an embodiment, a CloudDeploy function enables a programmer to deploy an expression to the cloud, where the deployed expression can be software code that can be executed (e.g., by the server 152), data that can be accessed and/or manipulated, etc. For example, in various embodiments, one or more of the following syntaxes are utilized:

CloudDeploy[expr]

In this example, an expression expr is deployed as a cloud object, and the server 152 assigns a universal resource identifier (URI) to the cloud object. In some embodiments, the URI may include a universally unique identifier (UUID), such as the UUID standardized by the Open Software Foundation (OSF) as part of the Distributed Computing Environment (DCE). The URI may be a universal resource locator (URL), in some embodiments. Evaluation of this function returns a handle to the cloud object. The cloud object can then be accessed using the handle.

CloudDeploy[expr, "uri"]

In this example, an expression expr is deployed as a cloud object at a given URI.

CloudDeploy[expr, CloudObject["uri"]]

In this example, an expression expr is deployed to a given cloud object. CloudObject is a handle to a cloud object at a specified URI.

Further details regarding the CloudDeploy function are described in U.S. patent application Ser. No. 14/549,541.

Forms Generation

The system 100 may facilitate efficient generation of electronic forms for eliciting user information (and processing that information, in some embodiments), and deployment of such forms to the web, according to some embodiments. For example, the cloud-based development system 188 and/or the cloud-based development front end 144 may include a forms generation module that enables efficient and flexible generation of electronic forms. Embodiments of a forms generation module and techniques for generating forms are discussed below. In some embodiments, such modules and techniques may be implemented by the system 100 of FIG. 1. In other embodiments, such modules and techniques may be implemented by systems different than the system of FIG. 1.

Figure 2:
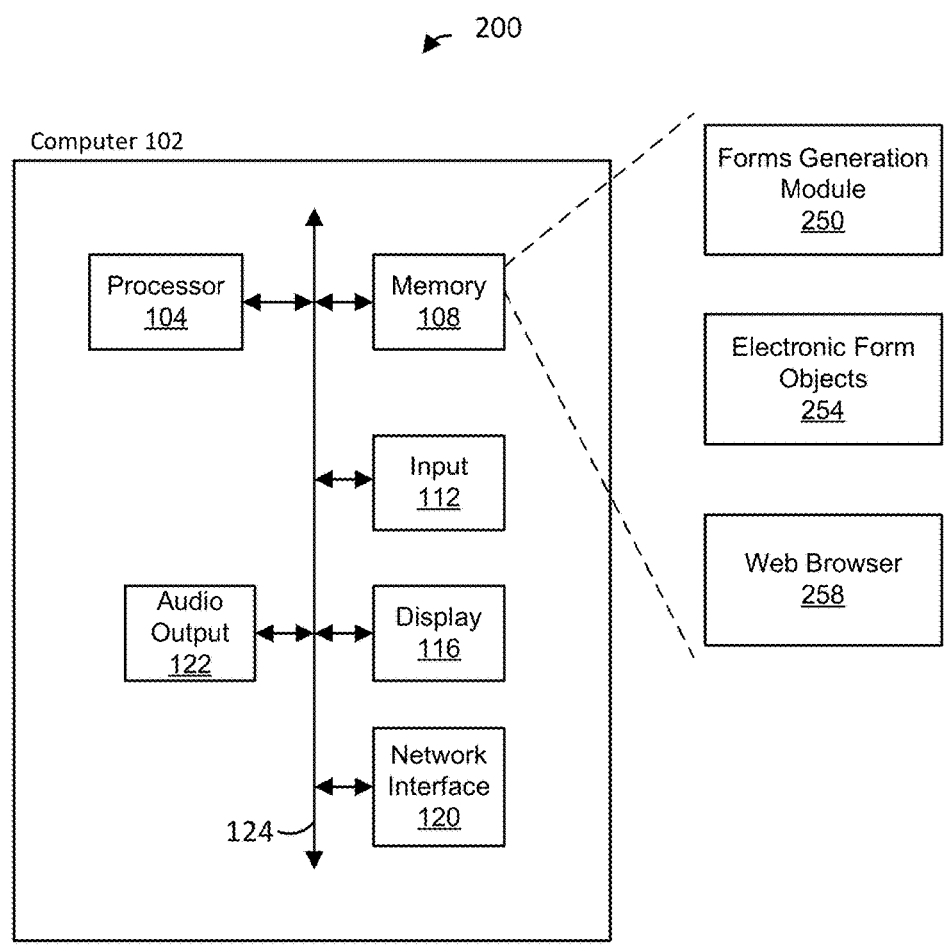
FIG. 2 is a diagram of an example system for generating electronic forms, according to an embodiment.

FIG. 2 is a diagram of an example system 200 for creating electronic forms for eliciting user information, according to an embodiment. As described in more detail below, the system 200 enables efficient and flexible generation of electronic forms, according to some embodiments.

In an embodiment, the system 200 includes a computer similarly structured to the computer 102 of FIG. 1. For purposes of brevity, like-numbered components are not described in detail.

In an embodiment, the memory 108 may store a forms generation module 250 that facilitates generation of electronic forms, as will be described in more detail below. In an embodiment, the forms generation module 250 comprises software instructions that, when executed by the processor 104, causes the processor to evaluate programming input from a programmer to generate an electronic form object. As an illustrative example, the electronic form object is generated i) to include HyperText Markup Language (HTML) elements and ii) such that a web browser can generate a web page form from the electronic form object, according to a specific embodiment. In other embodiments, the electronic form object is generated to include Extensible Hypertext Markup Language (XHTML) elements, Extensible Markup Language (XML) elements, style sheets (e.g., Cascading Style Sheets (CSS)), scripts (e.g., JAVASCRIPT®, etc.), and such that a suitable application (e.g., a web browser, a web browser with an appropriate plug in, etc.) can generate a suitable electronic form (e.g., a web page form) from the electronic form object.

As another example, the electronic form object is generated i) to include Computable Document Format (CDF) code, and ii) such that a CDF player (available from Wolfram Research, Inc.) can generate an electronic form from the electronic form object, according to an embodiment.

As another example, the electronic form object is generated i) to include a spreadsheet application macro, and ii) such that the spreadsheet application can render the electronic form, e.g., using spreadsheet elements.

In some embodiments, the electronic form object is generated such that a computational application (e.g., MATHEMATICA® or another suitable application) prompts the user to provide input via one or more command line prompts. In some embodiments, electronic form object is generated such that a suitable application (e.g., having or utilizing voice synthesizer technology and/or voice recognition technology) prompts the user with audio prompts to provide voice input. Thus, in some embodiments, the electronic form need not be displayed on a display device and/or need not utilize graphical user interface (GUI) elements.

In some embodiments, generated electronic form objects 254 are stored in the memory 108.

In some embodiments, the forms generation module 250 is a component of a compiler, i.e., a computer program that transforms source code written in a programming language (e.g., source code, a scripting language, etc.) into another computer language (e.g., object code, a machine language, a register transfer language (RTL), etc.), typically to create an executable program. In some embodiments, the forms generation module 250 is a component of an interpreter, i.e., a computer program that directly executes, i.e. performs, instructions written in a programming or scripting language (referred to herein for brevity as a "programming language"), without first compiling the instructions into a machine language program. Thus, in some embodiments, the programming input evaluated by the forms generation module 250 includes software instructions written in a programming language.

In some embodiments, the forms generation module 250 is a component of a software application such as a computational application. For example, the forms generation module 250 may be a component of the MATHEMATICA® computational software program developed by Wolfram Research, Inc., according to a specific embodiment.

In an embodiment, the memory 108 may store a web browser 258. In an embodiment, the web browser 258, when executed by the processor 104, can generate web page forms from at least some electronic form objects 254, according to an embodiment. For example, in an embodiment, the web browser 258 is utilized by a programmer for visualizing, adjusting, modifying, etc., electronic forms generated using the forms generation module 250.

Figure 3:
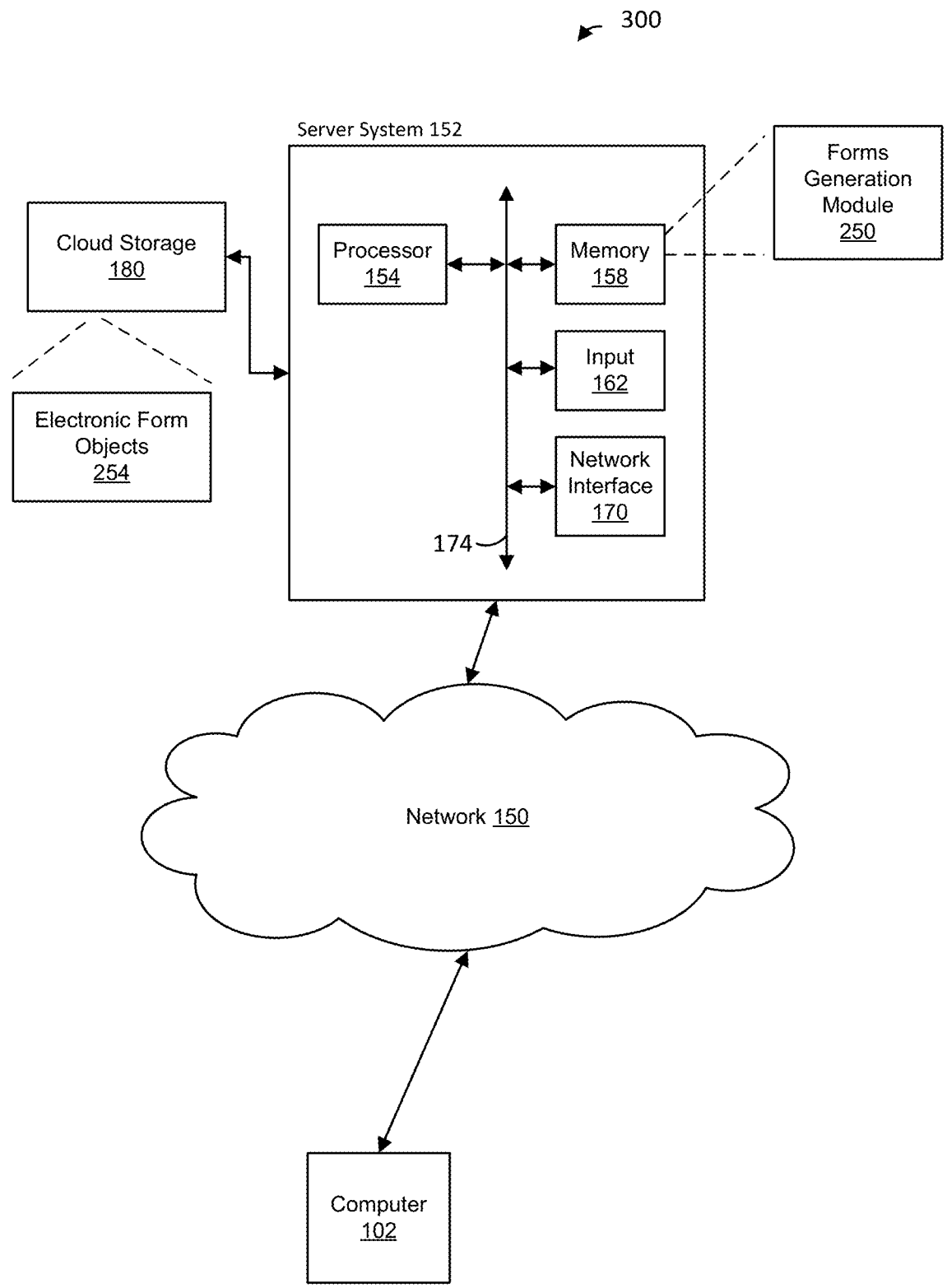
FIG. 3 is a diagram of another example system for generating electronic forms, according to another embodiment.

FIG. 3 is a diagram of another example system 300 for creating electronic forms for eliciting user information, according to another embodiment. As described in more detail below, the system 300 enables efficient and flexible generation of electronic forms, according to some embodiments. In an embodiment, the system 300 is similarly structured to the system 100 of FIG. 1. For purposes of brevity, like-numbered components are not described in detail.

In an embodiment, the memory 158 may store some or all of the forms generation module 250 discussed above. For example, in an embodiment, the forms generation module 250 is implemented as a client-server system, and the memory 158 stores a server portion of the forms generation module 250, whereas the memory 108 of the computer 102 stores a client portion of the forms generation module 250. In an embodiment, a programmer uses the computer 102 to provide programming input to the server 152 via the network 150. The server 152 then generates an electronic form object, and the electronic form object is stored in a memory.

For example, in an embodiment, the electronic form object is stored in the memory 158 and/or the cloud storage 180. In some embodiments, the cloud storage 180 is omitted. In another embodiment, the electronic form object is transmitted to the computer 102, via the network 150, and is stored in the memory 108. In another embodiment, the electronic form object is stored in a memory of another server system (e.g., a web server (not shown)) so that the electronic form object is accessible via the Internet, for example.

Figure 4:
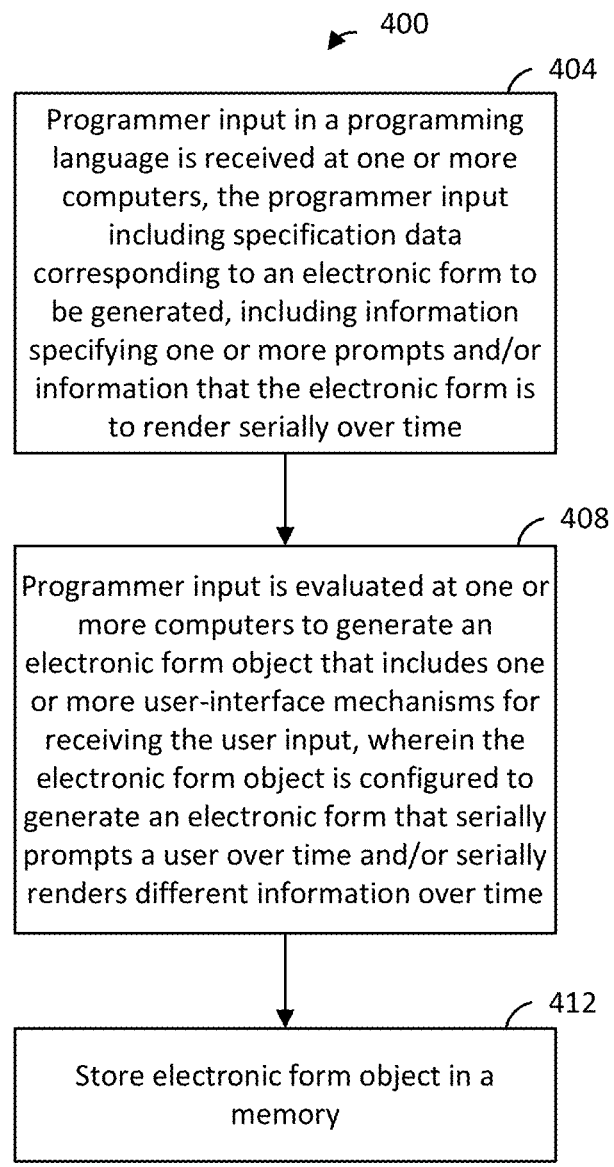
FIG. 4 is a flow diagram of an example method for generating electronic forms, according to an embodiment.

FIG. 4 is a flow diagram of an example method 400 for generating an electronic form, according to an embodiment. The method 400 may be implemented by the system 100 of FIG. 1, the computer 102 of FIG. 2, and/or the system 300 of FIG. 3, in some embodiments, and the method 900 is discussed with reference to FIGS. 2 and 3 for explanatory purposes. In other embodiments, however, the method 400 is implemented by a suitable computer or a suitable system (e.g., multiple computers) other than the system 100, the computer 102 and/or the system 300.

At block 404, programmer input in a programming language is received at one or more computers. For example, programmer input is received, via one or more input devices 112, at the computer 102. In some embodiments, the computer 102 transmits the programmer input to the server 152 via the network 150, and thus the programmer input is received at the server 152. The programmer input includes specification data corresponding to an electronic form to be generated. In an embodiment, the programmer input corresponds to an electronic form that serially prompts a user over time and/or serially renders different information over time. In an embodiment, the specification data includes information specifying one or more prompts and/or information that the electronic form is to render serially over time.

The specification optionally may include a parameter that indicates a function to be applied to the user input received via the electronic form.

Figure 5A:
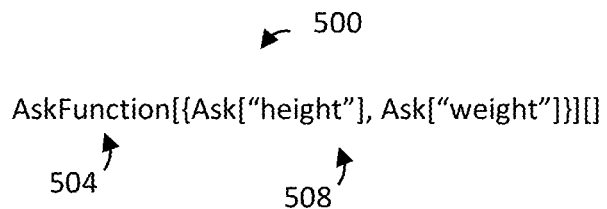
FIG. 5A is an example of programming input that may be utilized to generate an electronic form, according to an embodiment.

FIG. 5A illustrates an example of programmer input 500 such as programmer input that can be received at block 404 (FIG. 4), according to an illustrative embodiment. The programmer input 500 includes a built-in function 504 of a programming language, i.e. AskFunction[ ], that a programmer may utilize to efficiently create an electronic form. In some embodiments, the computational application 140, the forms generation module 250, a compiler, an interpreter, etc., is configured to recognize the keyword "AskFunction" as corresponding to a built-in function of the programming language that corresponds to electronic form generation.

The built-in function 504 includes specification data 508. Generally, specification data such as the specification data 508 may include data to indicate properties of the form to be generated, according to an embodiment. For example, the specification data 508 includes data to indicate that the form is to elicit serially, over time, two inputs: "height" and "weight".

Referring again to FIG. 4, at block 408, the programmer input is evaluated at one or more computers to generate an electronic form object that includes one or more user-interface mechanisms for receiving the user input. For example, the forms generation module 250 may evaluate the programmer input, in an embodiment. In some embodiments, the programmer input is fully evaluated in response to receiving the programmer input. In other embodiments, however, the programmer input is only partially evaluated, and full evaluation is not completed until a later time, such as upon or just before cloud deployment of the electronic form object, or upon or just before a function is to be applied in response to user input.

Block 408 may include evaluating the programmer input to generate code that is capable of being processed by an application (e.g., a computational application, a web browser or another suitable application) to render the electronic form such as on a display device or via an audio output device.

Block 408 may include evaluating the specification data to determine general characteristics of the form to be generated, according to an embodiment. For example, in some embodiments, determining general characteristics of the form to be generated may include determining one or more of i) how many user inputs are to be received by the form, ii) respective data types of the user inputs, etc. Referring to FIG. 5A, for example, the specification data 508 is evaluated to determine that the form is to elicit two elicit two inputs: "height" and "weight". Based on the evaluation of the specification data, code is generated for an electronic form that conforms to the general characteristics corresponding to the specification data 508. The generated code is capable of being processed by an application to render the electronic form (having the general characteristics).

Also, if the programmer input received at block 404 includes a parameter that indicates a function to be applied to the user input, block 408 may include evaluating this parameter to generate code in the electronic form object, in some embodiments. In some embodiments and/or scenarios, the indicated function may be a function expressed as or using built-in functions of the programming language and/or programming statements expressed using the programming language. Thus, evaluating the parameter that indicates a function may comprise evaluating one or more built-in functions of the programming language and/or one or more programming statements expressed using the programming language, in some embodiments. Based on the evaluation of the parameter that indicates a function, code is generated for the electronic form to cause the function to be applied to input data when the electronic form is utilized by a user. In some embodiment, the generated code is capable of being processed by the application that is to render the electronic form.

In other embodiments, however, the parameter that indicates a function may be evaluated at a later time, such as upon or just before cloud deployment of the electronic form object, or upon or just before the function is to be applied in response to user input. Thus, in some embodiments, the generated code causes evaluation of the function to be completed at "run-time", e.g., after user input is received.

Block 408 includes generating an electronic form object that is configured to generate an electronic form that serially prompts a user over time and/or serially renders different information over time. For example, in the example of FIG. 5A, the specification data 508 specifies that the electronic object is to generate a first prompt for "height" information from a user, and then to generate a second prompt for "weight" information from the user.

In some embodiments, block 408 includes generating the electronic form object to include one or more of HTML elements, XHTML elements, XML elements, style sheets (e.g., CSS), scripts (e.g., JAVASCRIPT®, etc.), CDF code, a spreadsheet macro, etc. In some embodiments, block 408 includes generating the electronic form object such that the electronic form object can be rendered by a computational application (e.g., the application 140, a spreadsheet application, etc.), a web browser, a web browser with a suitable plugin, a CDF player, an application that utilizes command line prompts, an application that utilizes audio prompt technology (e.g., voice synthesizer technology) and/or voice recognition technology, etc. Thus, in some embodiments, the electronic form need not be generated so that it can be rendered on a display device and/or such that it utilizes GUI elements. For example, the electronic form may be generated to utilize command line prompts, receive input via a command line, utilize audio prompts, receive audio input (e.g., voice input), etc.

In some embodiments, the computer 102 implements block 408. In some embodiments, the server system 202 implements block 408. In some embodiments, the computer 102 and the server system 202 together implement block 408.

At block 412, the electronic form object generated at block 408 is stored in a memory. For example, in an embodiment, the electronic form object is stored in the memory 108. In another embodiment, the electronic form object is stored in the memory 208. In another embodiment, the electronic form object is stored in some other suitable memory such as a memory of a web server (not shown in FIGS. 2 and 3).

Figure 5B:
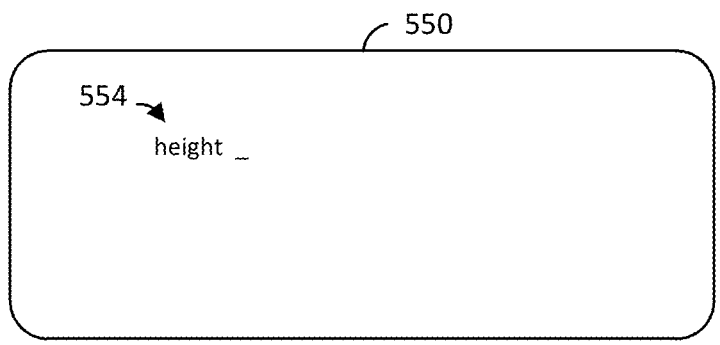
FIGS. 5B-D are illustrations of an electronic form generated in response to the programming input of FIG. 5A, according to an embodiment.

As discussed above, a suitable application may render an electronic form using the electronic form object. FIG. 5B is an illustration of an example graphical electronic form 550 that may be rendered based on an electronic form object generated in response to the programming input of FIG. 5A, according to an embodiment. The electronic form 550 includes a first GUI mechanism 554 corresponding to the "height" input discussed above with respect to FIG. 5A. The first GUI mechanism 554 prompts the user to enter text. In an embodiment, the forms generation module 250 generates the electronic form object such that the electronic form 550 includes appropriate user interface mechanisms in response to the specification data 508, in an embodiment.

Figure 5C:
Figure 5D:
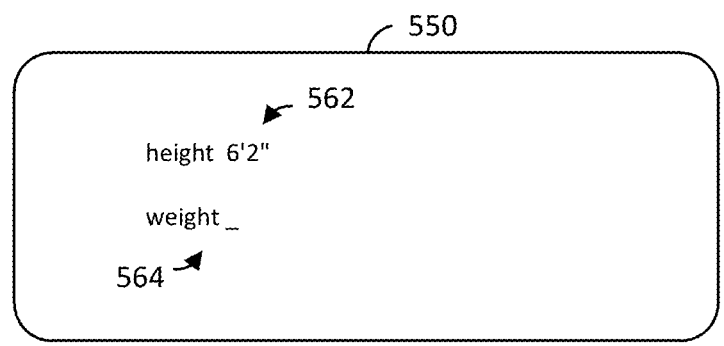

FIG. 5C is an illustration of the form 550 after a user has entered text 558. In response to a user entering an indication of submission of input (e.g., pressing "Enter" on a keyboard, selecting a "Submit" button (not shown) on the form 550, etc.), the form 550 is updated as shown in FIG. 5D. For example, the form 550 is updated to show first user input 562. Additionally, the electronic form 550 is updated to include a second GUI mechanism 564 corresponding to the "weight" input discussed above with respect to FIG. 5A. The second GUI mechanism 564 prompts the user to enter text. In an embodiment, the forms generation module 250 generates the electronic form object such that the electronic form 550 includes appropriate user interface mechanisms in response to the specification data 508, in an embodiment.

In some embodiments, when the form 550 is a web page form, the illustrations of FIGS. 5B, 5C, and 5D may correspond to a single dynamic web page (e.g., using client-side scripting and/or server-side scripting with reload). In some embodiments, when the form 550 is a web page form, the illustrations of FIGS. 5B, 5C, and 5D may correspond to different web pages.

Although FIG. 5D illustrates the "weight" prompt being displayed in a same display or window as the "height" prompt, the "weight" prompt instead could be rendered in a different display than the "height" prompt, according to an embodiment. For example, after receiving user input in response to the "height" prompt, the display of FIG. 5C could be closed and a new display generated for the "weight" prompt.

In some embodiments, audio prompts are generated instead of, or in addition to, the first GUI mechanism 554 and the second GUI mechanism 564.

FIG. 6A illustrates an example of programmer input 600 such as programmer input that can be received at block 404

(FIG. 4), according to an illustrative embodiment. The programmer input 600 includes built-in function 604 of a programming language, i.e. AskFunction[ ], that a programmer may utilize to efficiently create an electronic form. The built-in function 604 includes a parameter corresponding to first specification data 608. Generally, specification data such as the first specification data 608 may include data to indicate properties of the form to be generated, according to an embodiment. For example, the specification data 608 includes data to indicate that the form is to elicit an input having a format "Number".

The built-in function 604 also includes a parameter corresponding to second specification data 612. Generally, specification data such as the second specification data 612 may include data to indicate a function to be performed on data input via the electronic form, according to an embodiment. For example, the specification data 612 includes programmer input that specifies different actions to be taken in response to different values of the input. In particular, the specification data 612 specifies different information that is to be rendered to the user depending upon the data input by the user in response to an "estimate the value of it" prompt.

Referring again to FIG. 4, programmer input such as the programmer input 600 is evaluated at one or more computers to generate an electronic form object that includes one or more user-interface mechanisms for receiving the user input. Additionally, the programmer input 600 is evaluated at one or more computers to generate code in the electronic form object so that the function 612 is applied to user input, in some embodiments.

FIG. 6B is an illustration of an example graphical electronic form 650 that may be rendered based on an electronic form object generated in response to the programming input of FIG. 6A, according to an embodiment. The electronic form 650 includes a GUI mechanism 654 corresponding to the input discussed above with respect to FIG. 6A. The GUI mechanism 654 prompts the user to enter a number. In an embodiment, the forms generation module 250 generates the electronic form object such that the electronic form 550 includes appropriate user interface mechanisms in response to the specification data 608, in an embodiment.

FIG. 6C is an illustration of the form 650 after a user has entered a number 658. In response to a user entering an indication of submission of input (e.g., pressing "Enter" on a keyboard, selecting a "Submit" button (not shown) on the form 650, etc.), the form 650 is updated as shown in FIG. 6D. For example, the form 650 is updated to show first user input 662.

Additionally, the electronic form 650 is updated to display a result 664 of applying the function (specified by data 612) to the input. Referring again to FIG. 6A, the specification data 612 specifies different information that is to be displayed in the electronic form 650 depending on the data entered by the user in response to the prompt 654. For example, if the data entered by the user is a number between 3.14 and 3.15, the electronic form 650 is to be updated to display "correct". Otherwise, if the data entered by the user is a number between 3 and 3.5, the electronic form 650 is to be updated to display "pretty close". Otherwise, the electronic form 650 is to be updated to display "wrong".

In some embodiments, when the form 650 is a web page form, the illustrations of FIGS. 6B, 6C, and 6D may correspond to a single dynamic web page (e.g., using client-side scripting and/or server-side scripting with reload). In some embodiments, when the form 650 is a web page form, the illustrations of FIGS. 6B, 6C, and 6D may correspond to different web pages.

Although FIG. 6D illustrates the information "pretty close" being displayed in a same display or window as the prompt "estimate the value of $\pi$", the information "pretty close" instead could be rendered in a different display than the "estimate the value of $\pi$", according to an embodiment. For example, after receiving user input in response to the "estimate the value of $\pi$" prompt, the display of FIG. 6C could be closed and a new display generated for the "pretty close" prompt.

In some embodiments, an audio prompt is generated instead of, or in addition to, the GUI mechanism 654. In some embodiments, an audio output is generated instead of, or in addition to, displaying the result 664.

The programmer input 500 of FIG. 5A and the programmer input 600 of FIG. 6A both utilize a built-in function Ask["key"]. In some embodiments, the computational application 140, the forms generation module 250, a compiler, an interpreter, etc., is configured to recognize the keyword "Ask" as corresponding to a built-in function of the programming language that utilizes one or several of the following syntaxes.

Ask["key"].

When evaluated, the Ask function returns the value of key if it is already known, and prompts a user (e.g., by way of an electronic form) to provide the value of key if it is not already known.

Ask["key"→formspec].

formspec defines how the user input should be requested and/or interpreted.

Ask[{"key$_1$", "key$_2$", . . . }].

When evaluated, the Ask function returns the value of all key$_i$ if it is already known, and interactively prompts a user (e.g., by way of an electronic form) to provide the value of key$_1$ if it is not already known.

Ask[{"key$_1$"→formspec$_1$, "key$_2$"→formspec$_2$, . . . }].

formspec$_1$ defines how the user input for key$_1$ should be requested and/or interpreted.

In some embodiments, the programming language provides a built-in function AskDisplay[expr]. In some embodiments, the computational application 140, the forms generation module 250, a compiler, an interpreter, etc., is configured to recognize the keyword "AskDisplay" as corresponding to a built-in function of the programming language. When evaluated, AskDisplay[expr] displays a result of evaluating expr in the context of the AskFunction, according to an embodiment. In an embodiment, evaluation of AskDisplay causes a temporary display (e.g., a window, a box, a popup dialog, etc.) to show the result of evaluating expr. In an embodiment, the temporary display includes a user interface mechanism (e.g., an "OK" button) to permit a user to dismiss the temporary display.

FIG. 7 illustrates an example of programmer input 700 such as programmer input that can be received at block 404 (FIG. 4), according to an illustrative embodiment. The programmer input 700 includes first specification data 704 which specifies that an electronic form will serially prompt, over time, a user to input a "Name" and an "email". The programmer input 700 also includes second specification data 708 that includes the AskDisplay function. The second specification data 708 specifies that, after prompting for the "Name" and the "email", the electronic form will display "Thanks for signing up, here is your signup information", along with the "Name" and the "email" that the user entered in response to the previous prompts.

In some embodiments, the programming language provides a built-in function AskedQ["key"]. In some embodiments, the computational application 140, the forms generation module 250, a compiler, an interpreter, etc., is configured to recognize the keyword "AskedQ" as corresponding to a built-in function of the programming language. When evaluated, AskedQ["key"] returns True if there is value currently associated with key (e.g., user input corresponding to key has been received), and returns False otherwise, according to an embodiment.

In some embodiments, the programming language provides a built-in function AskedValue["key"]. In some embodiments, the computational application 140, the forms generation module 250, a compiler, an interpreter, etc., is configured to recognize the keyword "AskedValue" as corresponding to a built-in function of the programming language. When evaluated, AskedValue["key"] returns the value of key if there is value currently associated with key (e.g., user input corresponding to key has been received), and returns Missing[ . . . ] (e.g., a parameter indicating no value has been associated with key) otherwise, according to an embodiment. AskedValue["key"] is similar to Ask["key"], but does not request a value from the user, according to an embodiment.

FIG. 8A illustrates an example of programmer input 800 such as programmer input that can be received at block 404 (FIG. 4), according to an illustrative embodiment. The programmer input uses the AskedValue function. The programmer input 800 includes first specification data 804 which specifies that an electronic form will prompt a user to input a "Daily Report for Jen". The programmer input 800 also includes second specification data 808 which determines whether a condition is met (e.g., whether the date if February 2), and specifies that the electronic form will prompt the user to "Add a note to my report" in response to determining if the condition is met. The second specification data 808 specifies that if the condition is not met, the electronic form will not prompt the user to "Add a note to my report".

The programmer input 800 further includes third specification data 812 that specifies that, after prompting for "Daily Report for Jen" (and if the condition is met, "Add a note to my report"), the electronic form will display the "Daily Report for Jen" and the JenBirthdayAlert, if entered by the user in response to the "Add a note to my report" prompt.

FIGS. 8B-D are illustrations of an example graphical electronic form 850 that may be rendered based on an electronic form object generated in response to the programming input of FIG. 8A, according to an embodiment. FIGS. 8B-D illustrate the example graphical electronic form 850 at various stages including when user input is received. FIG. 8E illustrates an output generated by evaluation of the programmer input 800 of FIG. 8A.

Although FIG. 8C illustrates the prompt "Jen's birthday is today! Add a note to my report:" being displayed in a same display or window as the prompt "Daily Report for Jen", the prompt "Jen's birthday is today! Add a note to my report:" instead could be rendered in a different display than the "Daily Report for Jen" prompt, according to an embodiment. For example, after receiving user input in response to the "Daily Report for Jen" prompt, the display of FIG. 8C could be closed and a new display generated for the "Jen's birthday is today! Add a note to my report:" prompt.

In some embodiments, an audio prompt is generated instead of, or in addition to, the GUI mechanisms displayed in FIGS. 8B-8D. In some embodiments, an audio output is generated instead of, or in addition to, displaying the information illustrated in FIG. 8E.

In some embodiments, the programming language provides a built-in function AskConfirm["key"]. In some embodiments, the computational application 140, the forms generation module 250, a compiler, an interpreter, etc., is configured to recognize the keyword "AskConfirm" as corresponding to a built-in function of the programming language. When evaluated, AskConfirm["key"] generates a prompt to ask the user for confirmation of the current value of key, and allows the current value to be confirmed or changed. In response to the user confirming the value, AskConfirm["key"] returns the value. In response to the user not confirming the value, evaluation inside the AskFunction is effectively rewound back to when the user was first asked for the value, and thus the user is re-prompted for the value of key.

In various embodiments, the built-in function AskConfirm may utilize one or several of the following syntaxes.

AskConfirm["key", fun].

When AskConfirm["key", fun] is evaluated, the function fun is applied to determine how to ask the user for confirmation.

AskConfirm["key", "str"].

When AskConfirm["key", "str"] is evaluated, the string str is utilized when asking the user for confirmation.

FIG. 9A illustrates an example of programmer input 900 such as programmer input that can be received at block 404 (FIG. 4), according to an illustrative embodiment. The programmer input 900 uses the AskConfirm function. When evaluated, the programmer input 900 will prompt the user, using the Ask function, to provide a secret passphrase. When a user inputs the secret passphrase, the Ask function returns it as "password". The AskConfirm function then prompts the user for confirmation.

FIG. 9B is an illustration of an example graphical electronic form 920 that may be rendered based on an electronic form object generated in response to the programming input of FIG. 9A, according to an embodiment. The electronic form 920 includes a GUI mechanism 924 corresponding to the input for a passphrase. The GUI mechanism 924 prompts the user to enter a secret passphrase. In the illustrative example of FIG. 9B, the user has entered the text "foobar". To permit the user to submit the input text, the form includes a GUI mechanism 928, e.g., a "Submit" button.

FIG. 9C is an illustration of the form 920 after a user has entered the text "foobar" via the GUI mechanism 924, and selected the select button 928. In response, the form 920 is updated to show a prompt 944 for confirmation. The electronic form 920 is also updated to provide a GUI mechanism 948 for indicating whether the user is confirming the previously provided input, or wants to change the previous input. For example, in the example of FIG. 9C, the GUI mechanism 948 includes a check box that is checked when the user wants to change the previously provided input. In other embodiments, the GUI mechanism 948 corresponds to other suitable GUI mechanisms such as radio buttons (e.g., "yes", "no"), multiple check boxes (e.g., "yes", "no"), a button (e.g., "Submit without changing"), etc. The form also includes a GUI mechanism 952, e.g., a "Submit" button.

If the user did not check the box 948 and selected the submit button 952, the form 920 is updated as shown in FIG. 9D. On the other hand, if the user did check the box 948 and selected the submit button 952 (FIG. 9C), then evaluation of the AskFunction (FIG. 9A) is effectively rewound back to the Ask to prompt the user to again choose a secret passphrase. For example, if the user did check the box 948 and selected the submit button 952 (FIG. 9C), then the form 920 would be updated similar to FIG. 9B so that the user could submit another passphrase.

In some embodiments, when the form 920 is a web page form, the illustrations of FIGS. 9B, 9C, and 9D may correspond to a single dynamic web page (e.g., using client-side scripting and/or server-side scripting with reload). In some embodiments, when the form 920 is a web page form, the illustrations of FIGS. 9B, 9C, and 9D may correspond to different web pages.

In some embodiments, audio prompts are generated instead of, or in addition to, the GUI mechanisms described in connection with FIGS. 9B, 9C, and 9D. In some embodiments, an audio output is generated instead of, or in addition to, displaying the text "choose a secret passphrase" and "Do you want to change it?"

FIG. 10 illustrates another example of programmer input 1000 such as programmer input that can be received at block 404 (FIG. 4), according to an illustrative embodiment. The programmer input 1000 uses the AskConfirm function.

In some embodiments, the programming language provides a built-in function AskAppend["key"]. In some embodiments, the computational application 140, the forms generation module 250, a compiler, an interpreter, etc., is configured to recognize the keyword "AskAppend" as corresponding to a built-in function of the programming language. When evaluated, AskAppend["key"] prompts a user to provide a value, and appends the value to a current value associated with key, and returns a list. If there is not yet a value associated with key, AskAppend will create a list with the new value as the only element of the list.

In some embodiments, the built-in function AskAppend may utilize the following syntax.

AskAppend["key"→formspec].

formspec defines how the user input should be requested and/or interpreted.

FIG. 11 illustrates another example of programmer input 1100 such as programmer input that can be received at block 404 (FIG. 4), according to an illustrative embodiment. The programmer input 1100 uses the AskAppend function.

The AskFunction can be used in conjunction with Cloud-Deploy, in some embodiments. For example, FIG. 12 illustrates another example of programmer input 1200 such as programmer input that can be received at block 404 (FIG. 4), according to an illustrative embodiment. The programmer input 1200 uses AskFunction in conjunction with CloudDeploy.

In some embodiments, values can be set within AskFunction programmatically. For example, FIG. 13 illustrates example programmer input 1300, such as programmer input that can be received at block 404 (FIG. 4), in which a value is set programmatically, according to an illustrative embodiment.

The programmer input 1300 includes specification data 1304 that specifies prompting a user with a first prompt "What is your gender?" and to select between "male" and "female". The specification data 1304 includes data 1308 that specifies a key "pregnant" should be set to "False" if the user selects "male" in response to the first prompt. On the other hand, if the user selects "female" in response to the first prompt, the specification data 1304 includes data 1312 that specifies prompting the user with a second prompt "Are you pregnant?" and to select between "yes" and "no".

In some embodiments, values can be unset within AskFunction programmatically. For example, in an embodiment, the programmer input of the syntax "Ask["key"]=." Unsets a value associated with "key" within an AskFunction and effectively rewinds evaluation inside the AskFunction back to a previous point at which a value of "key" was requested. For example, FIG. 14 illustrates example programmer input 1400, such as programmer input that can be received at block 404 (FIG. 4), in which a value is unset programmatically, according to an illustrative embodiment.

The programmer input 1400 includes specification data 1404 that specifies prompting a user with a prompt "Enter a positive number", and then checking whether an entered value is less than or equal to zero. The specification data 1404 includes data 1408 that specifies a value of the key "x" should be unset if the entered value is less than or equal to zero. Evaluation of the AskFunction is then effectively rewound back to prompting the user with the prompt "Enter a positive number".

Referring again to FIG. 4, in an embodiment, when the specification data specifies data types of user input, the forms generation module 250 automatically generates the electronic form object to take a certain action(s) when one or more user inputs do not match data types specified by the specification data. For example, in an embodiment, the forms generation module 250 generates the electronic form object such that the user is prompted when one or more user inputs do not match data types specified by the specification data. As an illustrative example, in an embodiment, if the user enters input other than a number when number data is expected, the electronic form object may indicate to the user that the input must be a number. In some embodiments, specification data can be utilize to indicate that certain inputs are required, certain inputs are optional, certain inputs may have default values, etc.

In an embodiment, the forms generation module 250 utilizes default parameters regarding the type of electronic object to be generated.

In some embodiments the form generation module 250 is configured to automatically generate forms with user interface mechanisms appropriate for the type of input specified. For example, in some embodiments, techniques similar to those described in U.S. patent application Ser. No. 14/549,541 are utilized for providing user interface mechanisms appropriate for the type of input specified.

In some embodiments, specification data in the programming input may specify that user input received via the electronic form is to be processed using natural language processing (NLP) techniques, and the function specified in the programming input is to be applied to a result of the NLP processing of the user input. In some embodiments, the programming input may also specify an entity type to which the user input is to correspond to assist with NLP processing.

In various embodiments, functions describe herein can be modified, omitted, combined with other functions, etc. For example, in some embodiments, CloudDeploy and AskFunction are combined into single function, in an embodiment.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or the phrase "in an embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

At least some of the various blocks, operations, and techniques described above may be implemented utilizing hardware, a processor executing firmware instructions, a processor executing software instructions, or any combination thereof. When implemented in hardware, the hardware may comprise one or more of discrete components, an integrated circuit, an ASIC, a programmable logic device, etc. When implemented utilizing a processor executing software or firmware instructions, the software or firmware instructions may be stored in any tangible, non-transitory computer readable medium or media such as a magnetic disk, an optical disk, a tape drive, a RAM, a ROM, a flash memory, a memory of a processor, etc. Likewise, the software or firmware instructions may be delivered to a user or a system via any known or desired delivery method including, for example, on a tangible, non-transitory computer readable medium or media, or via communication media. The software or firmware instructions may include machine readable instructions that, when executed by the processor, cause the processor to perform various acts.

Upon reading this disclosure, those of skill in the art will appreciate still additional alternative structural and functional designs for a system and a process for identifying terminal road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating an electronic form, the method comprising:
   receiving, at one or more computers, programmer input in a first programming language, the programmer input including i) a built-in function of the programming language corresponding to electronic form generation, and ii) specification data corresponding to an electronic form to be generated, the specification data including data indicating one or more properties of user input to be elicited by the electronic form to be generated, the one or more properties of user input including at least one data type of user input to be elicited by the electronic form;
   evaluating, at one or more computers, the programmer input to generate an electronic form object that includes one or more user-interface mechanisms for receiving the user input, wherein
      evaluating the programmer input to generate the electronic form object includes evaluating the specification data to generate code in the electronic form object in a second programming language that is different from the first programming language, the generated code conforming to the one or more properties of the user input to be elicited by the electronic form to be generated and capable of being processed by an application to render the electronic form on or via a user interface device such that the electronic form serially prompts the user over time for multiple user inputs using different types of user interface mechanisms appropriate for different data types of the multiple user inputs; and
   storing the electronic form object in a memory of or communicatively coupled to the one or more computers, the electronic form object being stored for processing by an application to render the electronic form on or via a user interface device, wherein the electronic form object is configured to generate the electronic form such that electronic form serially prompts the user over time for multiple user inputs.

2. The method of claim 1, wherein:
   the programmer input includes data that indicates a function to be applied to one or more user inputs among the multiple user inputs; and
   the electronic form object is generated such that the electronic form object is configured to apply, upon being processed by the application, the function to the one or more user inputs received via the one or more user-interface mechanisms.

3. The method of claim 2, wherein the data that indicates the function to be applied to the one or more user inputs includes a built-in function of the programming language.

4. The method of claim 2, wherein the data that indicates the function to be applied to the one or more user inputs corresponds to a user-defined function expressed using the programming language.

5. The method of claim 1, wherein evaluating the programmer input to generate the electronic form object includes:
   evaluating the specification data to generate the electronic form object such that the electronic form object is configured to:
      render a first user interface mechanism to prompt the user for a first user input,
      determine whether a second user interface mechanism to prompt the user for a second user input is to be rendered, and render the second user interface mechanism only in response to determining that the second user interface mechanism is to be rendered.

6. The method of claim 5, wherein evaluating the programmer input to generate the electronic form object includes:
evaluating the specification data to generate the electronic form object such that the electronic form object is configured to determine whether the second user interface mechanism is to be rendered using the first user input.

7. The method of claim 5, wherein evaluating the programmer input to generate the electronic form object includes:
evaluating the specification data to generate the electronic form object such that the electronic form object is configured to determine whether the second user interface mechanism is to be rendered using information other than the first user input.

8. The method of claim 1, wherein:
receiving the programmer input comprises receiving the programmer input as a parameter of a built-in function of the programming language, the built-in function corresponding to cloud deployment;
the method further includes evaluating, at one or more computers, the built-in function; and
in response to evaluating the built-in function, storing the electronic form object in the memory such that the electronic form object is accessible on the Internet via a web browser.

9. A system for generating an electronic form, comprising:
one or more processors; and
one or more memory devices coupled to the one or more processors, the one or more memories storing machine readable instructions that, when executed by the one or more processors, cause the one or more processors to:
receive programmer input in a first programming language, the programmer input including specification data corresponding to an electronic form to be generated, the specification data including data indicating one or more properties of user input to be elicited by the electronic form to be generated, the one or more properties of user input including at least one data type of user input to be elicited by the electronic form,
cause the programmer input to be evaluated to generate an electronic form object that includes one or more user-interface mechanisms for receiving the user input, wherein
evaluating the programmer input to generate the electronic form object includes evaluating the specification data to generate code in the electronic form object in a second programming language that is different from the first programming language, the generated code conforming to the one or more properties of the user input to be elicited by the electronic form to be generated and capable of being processed by an application to render the electronic form on or via a user interface device such that the electronic form serially prompts the user over time for multiple user inputs using different types of user interface mechanisms appropriate for different data types of the multiple user inputs, and
store the electronic form object in the one or more memories of the system and/or cause the electronic form object to be stored in one or more other memories communicatively coupled to the system, the electronic form object being stored for processing by an application to render the electronic form on or via a user interface device, wherein the electronic form object is configured to generate the electronic form such that electronic form serially prompts the user over time for multiple user inputs.

10. The system of claim 9, wherein:
the programmer input includes data that indicates a function to be applied to one or more user inputs among the multiple user inputs; and
the one or more memories store machine readable instructions that, when executed by the one or more processors, cause the one or more processors to generate the electronic form object such that the electronic form object is configured to apply, upon being processed by the application, the function to the one or more user inputs received via the one or more user-interface mechanisms.

11. The system of claim 10, wherein the data that indicates the function to be applied to the one or more user inputs includes a built-in function of the programming language.

12. The system of claim 10, wherein the data that indicates the function to be applied to the one or more user inputs corresponds to a user-defined function expressed using the programming language.

13. The system of claim 9, wherein the one or more memories store machine readable instructions that, when executed by the one or more processors, cause the one or more processors to:
evaluate the specification data to generate the electronic form object such that the electronic form object is configured to:
render a first user interface mechanism to prompt the user for a first user input,
determine whether a second user interface mechanism to prompt the user for a second user input is to be rendered, and
render the second user interface mechanism only in response to determining that the second user interface mechanism is to be rendered.

14. The system of claim 13, wherein the one or more memories store machine readable instructions that, when executed by the one or more processors, cause the one or more processors to:
evaluate the specification data to generate the electronic form object such that the electronic form object is configured to determine whether the second user interface mechanism is to be rendered using the first user input.

15. The system of claim 13, wherein the one or more memories store machine readable instructions that, when executed by the one or more processors, cause the one or more processors to:
evaluate the specification data to generate the electronic form object such that the electronic form object is configured to determine whether the second user interface mechanism is to be rendered using information other than the first user input.

16. The system of claim 9, wherein:
receiving the programmer input comprises receiving the programmer input as a parameter of a built-in function of the programming language, the built-in function corresponding to cloud deployment;
the one or more memories store machine readable instructions that, when executed by the one or more processors, cause the one or more processors to:

evaluate the built-in function, and
in response to evaluating the built-in function, store the electronic form object in the memory such that the electronic form object is accessible on the Internet via a web browser.

17. A tangible, non-transitory computer readable medium or media storing instruction thereon that, when executed by one or more computer processors, cause the one or more computer processors to:
receive programmer input in a first programming language, the programmer input including specification data corresponding to an electronic form to be generated, the specification data including data indicating one or more properties of user input to be elicited by the electronic form to be generated, the one or more properties of user input including at least one data type of user input to be elicited by the electronic form,
cause the programmer input to be evaluated to generate an electronic form object that includes one or more user-interface mechanisms for receiving the user input, wherein
evaluating the programmer input to generate the electronic form object includes evaluating the specification data to generate code in the electronic form object in a second programming language that is different from the first programming language, the generated code conforming to the one or more properties of the user input to be elicited by the electronic form to be generated and capable of being processed by an application to render the electronic form on or via a user interface device such that the electronic form serially prompts the user over time for multiple user inputs using different types of user interface mechanisms appropriate for different data types of the multiple user inputs, and
cause the electronic form object to be stored in one or more memories of a computer system, the electronic form object being stored for processing by an application to render the electronic form on or via a user interface device, wherein the electronic form object is configured to generate the electronic form such that electronic form serially prompts the user over time for multiple user inputs.

18. The tangible, non-transitory computer readable medium or media of claim 17, wherein:
the programmer input includes data that indicates a function to be applied to one or more user inputs among the multiple user inputs; and
the tangible, non-transitory computer readable medium or media store machine readable instructions that, when executed by the one or more processors, cause the one or more processors to generate the electronic form object such that the electronic form object is configured to apply, upon being processed by the application, the function to the one or more user inputs received via the one or more user-interface mechanisms.

19. The tangible, non-transitory computer readable medium or media of claim 17, further storing machine readable instructions that, when executed by the one or more processors, cause the one or more processors to:
evaluate the specification data to generate the electronic form object such that the electronic form object is configured to:
render a first user interface mechanism to prompt the user for a first user input,
determine whether a second user interface mechanism to prompt the user for a second user input is to be rendered, and
render the second user interface mechanism only in response to determining that the second user interface mechanism is to be rendered.

20. The tangible, non-transitory computer readable medium or media of claim 19, further storing machine readable instructions that, when executed by the one or more processors, cause the one or more processors to:
evaluate the specification data to generate the electronic form object such that the electronic form object is configured to determine whether the second user interface mechanism is to be rendered using the first user input.

* * * * *